United States Patent [19] [11] 3,955,187

Bigelow [45] May 4, 1976

[54] PROPORTIONING THE ADDRESS AND DATA SIGNALS IN A R.M.S. RESPONSIVE DISPLAY DEVICE MATRIX TO OBTAIN ZERO CROSS-TALK AND MAXIMUM CONTRAST

[75] Inventor: John E. Bigelow, Clifton Park, N.Y.

[73] Assignee: General Electric Company, Schenectady, N.Y.

[22] Filed: Apr. 1, 1974

[21] Appl. No.: 456,969

[52] U.S. Cl. .................... 340/324 M; 350/160 LC
[51] Int. Cl.$^2$ .................................... G02F 1/18
[58] Field of Search ...... 340/166 R, 166 EL, 324 R, 340/324 M, 336; 350/160 LC

[56] References Cited

UNITED STATES PATENTS 3,794,990 2/1974 Kishimoto ........................ 340/336

OTHER PUBLICATIONS

Two-Freq., Compensated Threshold Multiplexing of L. C. Displays, Alt et al., IBM Tech. Discl. Bull., Oct. 1973, Vol. 16, No. 5, pp. 1578–1581.

*Primary Examiner*—Marshall M. Curtis
*Attorney, Agent, or Firm*—Daniel R. Levinson; Joseph T. Cohen; Jerome C. Squillaro

[57] ABSTRACT

An improved matrix address system is disclosed wherein zero cross-talk and maximum contrast are obtained by utilizing a constant absolute magnitude data signal, and address and data signals in a voltage ratio equal to the square root of $n$, where $n$ is the number of addressable columns and therefore the number of devices in a given row, so as to yield the maximum ratio, R, of the r.m.s. values of the "on" voltage and the "off" voltage applied to any given device, namely, $R = 1 + 1/\sqrt{n}$.

5 Claims, 5 Drawing Figures

PROPORTIONING THE ADDRESS AND DATA SIGNALS IN A R.M.S. RESPONSIVE DISPLAY DEVICE MATRIX TO OBTAIN ZERO CROSS-TALK AND MAXIMUM CONTRAST

This invention relates to a matrix addressing system and, in particular, to a zero cross-talk matrix addressing system for square-law responsive devices.

In the prior art, there are a number of devices that have a square-law response to an applied voltage. Stated another way, the response of the devices is proportional to the root mean square (r.m.s.) value of the applied alternating voltage signal. Perhaps the most widely known class of such devices includes heating elements and incandescent lamps. A less widely recognized class of r.m.s. responsive devices includes liquid crystal displays.

Liquid crystal devices per se are an attractive display medium due to their low cost, low power consumption and simplicity of construction. In order to increase the versatility of these devices, typical displays comprise one or more sets of segments, each set of which, by suitable selection, forms all of the desired alphanumerical characters and punctuation. A number of matrix addressing systems have been proposed for selecting the appropriate segments. It is desired that the matrix address circuitry for these devices not compromise the simplicity and economy of the medium. In addition, a particularly desirable feature of the matrix address circuitry is that it have zero cross-talk.

Zero cross-talk is a characteristic whereby the activating of a particular segment of a matrix does not cause a change in a segment which is not being addressed. Specifically, in a matrix having orthogonal rows and columns, data applied to a particular row is coupled to every element in that row. The particular segment being addressed is selected by the coincidence of a signal on the column with the data signal. For zero cross-talk, the data signal must not be able to change any but that particular segment.

As more fully described herein, the response curve of a liquid crystal device is such that the device does not turn completely on in response to an applied signal that just exceeds the response threshold. Rather, the degree of response increases with the applied signal until a saturation poiint is reached (ignoring, for the sake of clarity, the effects of pulse duration and frequency).

Some addressing systems of the prior art operate on the basis of producing a maximum potential difference across the liquid crystal for an on condition. For example, in the "half select" addressing system, the data signal and address selection signal have the same amplitude, V, producing a maximum potential difference across the liquid crystal of 2V. However, if V equals the threshold potential, the contrast of the cell, i.e., the change in optical characteristic, is not very high, depending upon the response of the cell. In the off condition of an addressed intersection, a potential difference of either 0 volts of V volts may be applied to a non-addressed intersection, depending upon the data signal, producing cross-talk in other segments connected to the same data line.

In the past, the r.m.s. values of the combined data and address selection signals have been largely ignored. It has been found, however, that contrast can be enhanced if the difference between the r.m.s. voltages for the on and off condition is a maximum, rather than the difference in instantaneous amplitude.

In view of the foregoing it is therefore an object of the present invention to provide an improved matrix address system having zero cross-talk.

Another object of the present invention is to provide an improved matrix address system having a maximum difference in r.m.s. voltages for the on and off conditions.

A further object of the present invention is to provide an improved matrix address system having both zero cross-talk and a maximum difference in the r.m.s. voltages for the on and off conditions.

The foregoing objects are achieved in the present invention wherein zero cross-talk is achieved by maintaining constant the absolute magnitude of the data signal and wherein maximum contrast is attained by proportioning the magnitudes of the address and data signals in a ratio dependent upon the number of segments being addressed, thereby producing a maximum difference in the r.m.s. values of the applied signals for the on and off conditions.

A more complete understanding of the present invention can be obtained by considering the following detailed description in conjunction with the accompanying drawings, in which.

Figure 1:
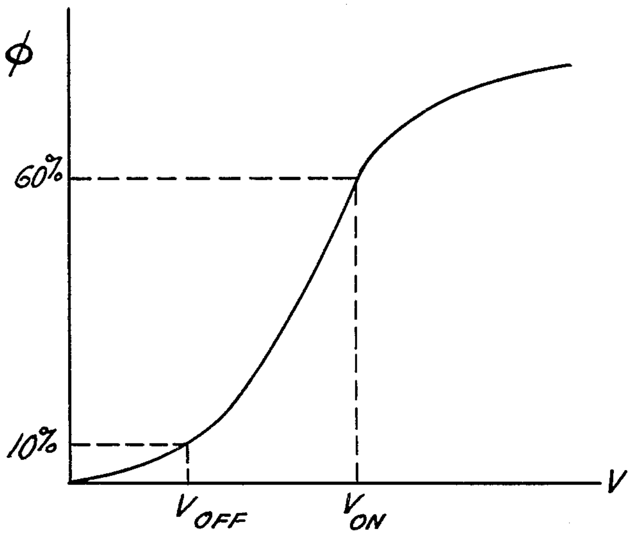
FIG. 1 illustrates a typical response curve for a liquid crystal device.

As illustrated in FIG. 1, the response of a liquid crystal material, $\phi$, varies non-linearly with the applied voltage, $V$. The lower applied voltage, $V_{off}$, is approximately equal to the threshold voltage of the liquid crystal material, i.e., approximately equal to the voltage at the first "knee" of the response curve. In general, it has been desired to make the voltage of the turn-on signal, $V_{on}$, as high as possible in order to produce the maximum change in characteristic of the display. The response, $\phi$, to an applied voltage, $V$, may comprise any of the electro-optical effects exhibited by the various liquid crystal materials. For example, $\phi$ may represent the relative light transmission ability of a twisted nematic liquid crystal material and polarizers in a display. As illustrated in FIG. 1, $V_{off}$ corresponds to a 10 percent light transmission by the liquid crystal material and $V_{on}$ represents a 60 percent light transmission by the display.

For a single device, $V_{off}$ and $V_{on}$ may have a potential difference therebetween corresponding to the 0 and 100 percent characteristic level. However, when a plurality of liquid crystal devices are interconnected in a matrix or when more than one device is coupled to a given signal line, limitations are imposed upon the voltages that may be applied to the matrix for producing the desired display.

Figure 2:
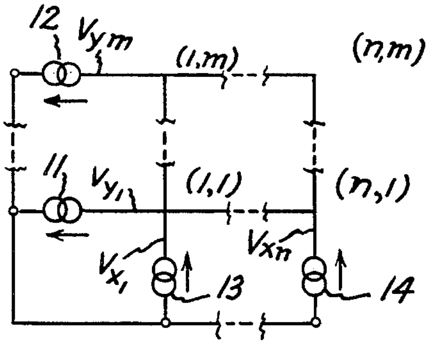
FIG. 2 illustrates a portion of a matrix comprising a plurality of liquid crystal devices.

FIG. 2 illustrates a portion of a matrix comprising signal generators 11 and 12 connected to the $V_{yl}$ and $V_{ym}$ signal lines, respectively. Signal generators 13 and 14 are connected to signal lines $V_{xl}$ and $V_{xn}$, respectively. The arrow adjacent each generator indicates the direction of positive current flow. The matrix display illustrated in FIG. 2 may, for example, comprise a plurality of segments formed by liquid crystal devices, one each at the intersections illustrated, or a single liquid crystal device may be utilized wherein the signal lines comprise orthogonal sets of parallel, transparent electrodes formed on opposite, interior faces of the liquid crystal device. In the latter case, each segment is formed by the area of overlap between the electrodes at a given intersection.

Suitable liquid crystal devices are well known per se in the art, i.e., both materials and methods of construction are known per se for providing suitable liquid crystal devices.

Figure 3:
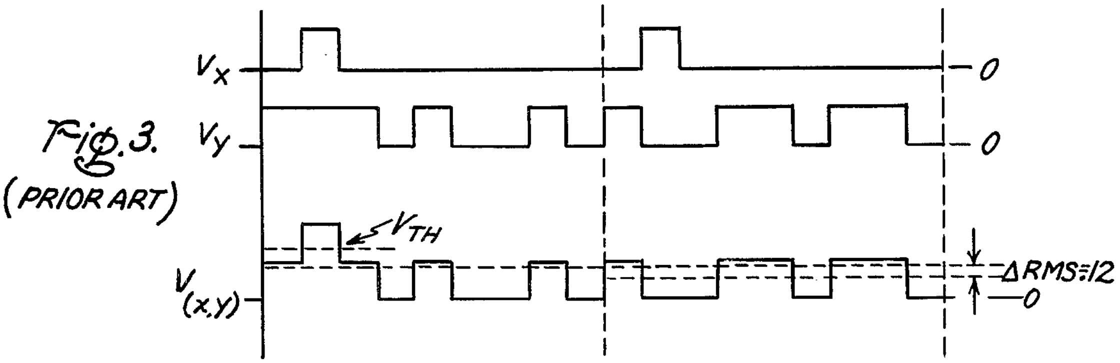
Fig. 3. (PRIOR ART)
FIG. 3 illustrates an addressing system exhibiting cross-talk.

FIG. 3 illustrates a half-select system for nine columns. The magnitude of the data signal at $V_y$ equals the magnitude of the address signal at $V_y$. In this addressing system, however, the difference in r.m.s. voltage between the on and off condition for the particular intersection $(n,m)$ is not great. This has the effect of extending the response time of the liquid crystal material since the material does not sense a significant difference in operating potential during successive scans even though the applied data signal indicates a transition is to take place, for example, from an on to an off condition. Assuming FIG. 3 illustrates such a transition and that a particular intersection has previously been on for a number of scans, the second scan illustrated in FIG. 3, where the material of that particular intersection is to be turned off, does not have an r.m.s. voltage much lower than in the previous scan wherein the material was intended to be in an on condition. Thus, in a single scan interval, the optical chracteristic of the display may not change significantly, even though the threshold voltage is exceeded in the first scan interval and not in the second scan interval. This is true because, in practice, the threshold is not perfectly sharp but is rounded as shown by the first knee of the curve of FIG. 1.

Further, the addressing system illustrated in FIG. 3 exhibits cross-talk. This can be shown by considering the variation in r.m.s. conditions in a given row for the on and off conditions of a single intersection, e.g., (2,1), in that row. The following table shows the results at two extremes, viz, all other intersections are either on or off.

TABLE I

| (2,1) | all others | relative units of r.m.s. voltage | ratio* |
|---|---|---|---|
| on | off | $\sqrt{4/9}$ | ∞ |
| off | off | 0 | |
| on | on | $\sqrt{12/9}$ | ⅔ $\sqrt{3}$ |
| off | on | $\sqrt{9/9}$ | |

*ratio of "on" r.m.s. to "off" r.m.s.

As can be seen, the ratio varies from infinity down to ⅔ 3. It is this variation that causes cross-talk.

Figure 4:
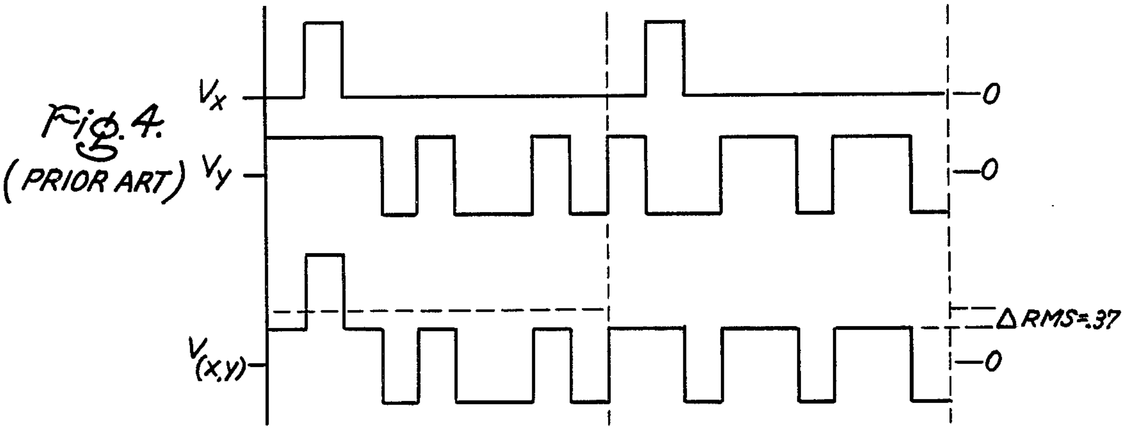
Fig. 4. (PRIOR ART)
FIG. 4 illustrates the "one third select" addressing system.

FIG. 4 illustrates what is known as the ⅓ select system in which the address signal has an amplitude equal to twice that of the data signal. As illustrated in FIG. 4, the difference in r.m.s. value between the on and off condition is improved over the addressing system illustrated in FIG. 3. Further, since the absolute magnitude of the data signal is constant, the system exhibits zero cross-talk. This is shown by

TABLE II

| (2,1) | all others | relative units of r.m.s. voltage | ratio |
|---|---|---|---|
| on | off | $\sqrt{17/9}$ | $\sqrt{17/9}$ |
| off | off | $\sqrt{9/9}$ | |
| on | on | $\sqrt{17/9}$ | $\sqrt{17/9}$ |
| off | on | $\sqrt{9/9}$ | |

wherein there is no variation in the ratio r.m.s. values for the on and off condition.

However, in accordance with the present invention, it is desired to optimize the difference in r.m.s. value between the on and off condition to thereby provide an improved contrast display while at the same time providing a zero cross-talk addressing system.

In a matrix, as illustrated in FIGS. 2–4, the voltage $v$ at any particular intersection $(n,m)$ is given by $$v_{(n,m)} = v_x + v_y \tag{1}$$

wherein $$v_x = 0,\ V_x \tag{2}$$

and $$v_y = +V_y,\ -V_y \tag{3}$$

It will be noted that the addressing signal, $V_x$, may have any desired maximum potential, $V_x$, while at the same time the data signal has a constant absolute magnitude.

At a given intersection (1,1) the on voltage, $v_{on}$, is given by $$v_{(1,1)on} = V_x + V_y \tag{4}$$

while the off voltage, $v_{(1,1)off}$, is given by $$V_{(1,1)off} = V_x - V_y \tag{5}$$

The root mean value of the on voltage is given by $$V_{on} = \sqrt[q]{\frac{(V_x+V_y)^q + (n-1)\,(V_y)^q}{n}}, \tag{6}$$

while the root mean value of the off voltage is given by $$V_{off} = \sqrt[q]{\frac{(V_x-V_y)^q + (n-1)\,(V_y)^q}{n}} \tag{7}$$

The ratio of on to off of the root mean value of the voltages is $$R = \sqrt[q]{\frac{(V_x+V_y)^q + (n-1)\,(V_y)^q}{(V_x-V_y)^q + (n-1)\,(V_y)^q}} \tag{8}$$

As previously noted, there are many devices, frequently encountered, whose response to an applied signal follows a square law. Thus the preceding generalized equation may be modified by setting $q$ equal to 2, thereby obtaining $$R = \sqrt{\frac{(V_x+V_y)^2 + (n-1)(V_y)^2}{(V_x-V_y)^2 + (n-1)(V_y)^2}} \quad (9)$$

Multiplying out the squares and reducing terms yields $$R = \sqrt{\frac{V_x^2 + nV_y^2 + 2V_xV_y}{V_x^2 + nV_y^2 - 2V_xV_y}} \quad (10)$$

If we define $S$ as equal to $V_x/V_y$, then $$R = \sqrt{\frac{S^2 + n + 2S}{S^2 + n - 2S}} \quad (11)$$

Since it is desired to obtain a maximum ratio between the r.m.s. values for the on and off condition, to thereby produce the maximum difference between the on and off condition, it can be shown that differentiating the preceding equation (by the law for differentiating composite functions, also known as the chain rule) and setting $dR/dS$ equal to zero yields $$S = \pm\sqrt{n} \quad (12)$$

Substituting this value of $S$ into the preceding yields $$R_{max} = \sqrt{\frac{n \pm \sqrt{n}}{n \mp \sqrt{n}}} \quad (13)$$

It can be shown (by expanding according to the binomial theorem) that $$R_{MAX} \cong 1 + 1/\sqrt{n} \quad (14)$$

In other words, when the ratio of the address and data voltages is chosen in accordance with the square root of the number of columns to be addressed, (see equation (12), where $S = V_x/V_y$) a maximum ratio of the r.m.s. values for the on and off conditions is obtained and that this ratio is approximately equal to $$1 + (1/\sqrt{n}).$$

It is understood that this approximation represents only the first two terms of a series and is accurate to two decimal places provided $n$ is greater than approximately 10. The value of the ratio given by the above approximation is lower than actually obtained if the voltage ratios are chosen in accordance with the present invention, i.e., as the square root of the number of elements being addressed.

In accordance with the present invention, zero cross-talk and a maximum ratio is obtained. This is shown, for example, by

TABLE III

| (2,1) | all others | relative units of r.m.s. of voltage | ratio |
|---|---|---|---|
| on | off | $\sqrt{24/9}$ | $\sqrt{2}$ |
| off | off | $\sqrt{12/9}$ | |
| on | on | $\sqrt{24/9}$ | $\sqrt{2}$ |
| off | on | $\sqrt{2/9}$ | |

Thus, an addressing system is provided wherein there is zero cross-talk and a maximum of contrast between the on and off states due to the maximum difference obtainable in the r.m.s. values of the applied signals for the on and off conditions.

Figure 5:
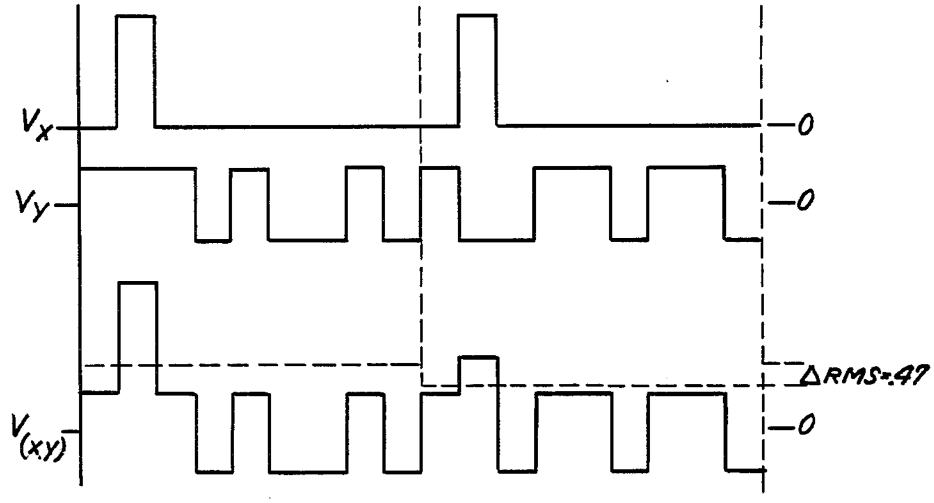
FIG. 5 illustrates the addressing system in accordance with the present invention.

FIG. 5 illustrates an example of the present invention applied to a matrix comprising nine columns. In accordance with equation (12) above, the ratio of the address signal to the data signal is equal to the square root of 9, or 3. As can be seen by comparison with FIGS. 3 and 4, the difference in r.m.s. values for the on and off condition when nine columns are scanned is approximately 27 percent higher than for the system illustrated in FIG. 4 and almost 4 times as great as the system illustrated in FIG. 3. With a larger number of columns this advantage of the present invention becomes still larger.

As a specific example of the present invention, a mixture of liquid crystal materials comprising 90 percent MBBA, N-(methoxybenzylidene)-p-n-butyl aniline, and 10 percent BUBAB, N-(p-butoxybenzylidene)-p-aminobenzonitrile, produces a 50 percent change in transmission characteristic for an r.m.s. voltage ratio of 1.12:1; i.e., for a 64 element display. Similar results are obtained with a mixture comprising 95 percent MBBA and 5 percent PEBAB, N-(p-ethoxybenzylidene)-p-aminobenzonitrile.

Having thus described the invention, it will be apparent to those of skill in the art that various modifications may be made within the spirit and scope of the present invention. For example, while the address and data signals are illustrated as pulses, it is understood that the waveforms equally represent the pulse-shaped envelope of a modulated carrier wherein a reversal in polarity represents a phase reversal of the carrier. Also, while primarily described in connection with liquid crystal devices, the present invention may be utilized with any matrix addressed, r.m.s. responsive device; for example, electro-luminescent and incandescent devices. Further, while the present invention enables one to obtain maximum contrast, this is not to say that gray scale is eliminated. Gray scale is readily obtained, for example, by varying the duration of the data signal during address coincidence. Thus, in FIG. 5, $V_y$ may change from (+) to (−) during the time when the particular column is being addressed. Where modulated carriers are utilized for the address and data signals, this corresponds to either a phase reversal of the data signal at some point during address coincidence or to a constant phase shift of the data signal with respect to the address signal for the entire address coincidence period.

In the foregoing description and following claims, the concrete terms "columns" and "rows" are used to simplify description. Since rotating FIG. 2 (in the plane of the paper) 90° will interchange columns and rows without otherwise affecting the operation of the device, it is deemed obvious that these terms are used in a purely relative sense, and that consistent substitution of one of the terms for the other (and vice versa) will not affect the operation in any way. Stated in other terms, the columns can be more or less horizontal in FIG. 2 as long as the rows are then read as more or less vertical. In general, the terms columns and rows merely mean that two distinct types of sub-arrays which make up the intersection type of matrix array schematically shown in FIG. 2; and, in fact, neither need be actually vertical nor horizontal, nor is it critical that they even designate sub-arrays which are actually perpendicular to each other (rather than they merely intersect each other in some regular manner).

What I claim as new and desire to secure by Letters Patent of the Unites States is:

1. In a method of driving a display device comprising a matrix of square-law responsive display elements in an array including a plurality of $n$ columns and a plurality of rows, in which address signals, $V_x$, are applied to the columns of said array and data signals, $V_y$, are applied to the respective rows of said matrix array in timed relationship to said application of said address signals, wherein the improvement comprises:

making the amplitudes of said address and data signals such that their ratio is defined by:

$$\frac{V_x}{V_y} = \sqrt{n},$$

so that the ratio, $R$, of the root mean square amplitude of the total signal $V_{on}$ applied to display elements intended to be on and the root mean square amplitude of the total signal, $V_{off}$, applied to display elements intended to be off is given substantially by:

$$R = 1 + 1/\sqrt{n}.$$

2. The method according to claim 1, in which:

said address and said data signals comprise modulated carriers.

3. The method according to claim 2, in which:

said address signal comprises a phase modulated carrier.

4. The method according to claim 3, in which:

said data signal is either in phase or 180° out of phase with said address signal.

5. The method according to claim 1, in which:

said display elements comprise liquid crystal devices.

* * * * *